Oct. 2, 1945.  E. G. PIERCE  2,385,938
GAS FILTER
Filed Oct. 4, 1943  3 Sheets-Sheet 1
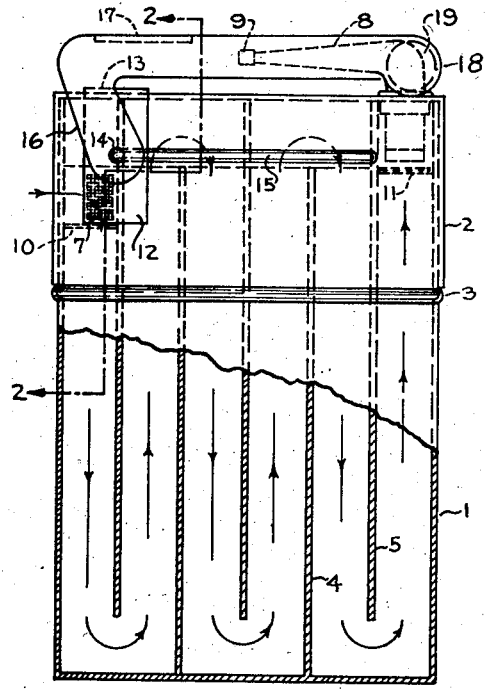
Fig. 1.
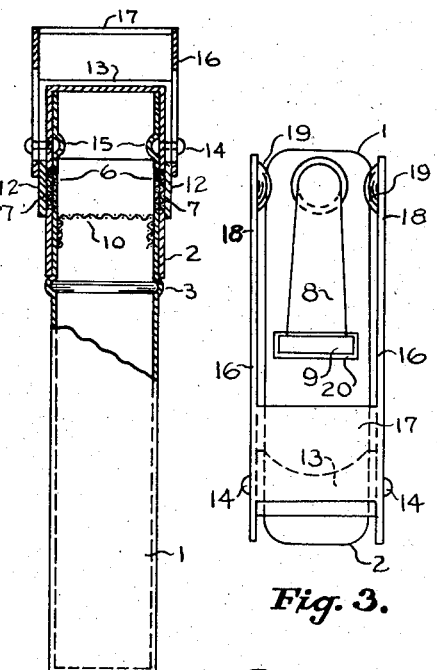
Fig. 2.
Fig. 3.
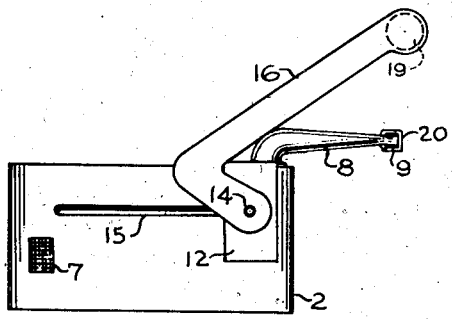
Fig. 4.
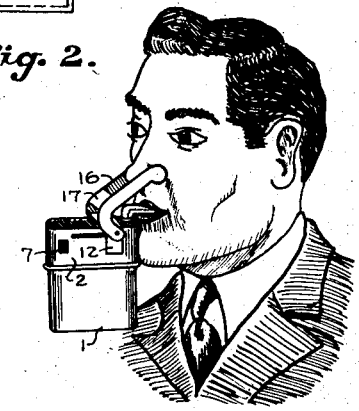
Fig. 5.
INVENTOR.
EDWIN G. PIERCE.
BY O. Z. McCoy
ATTORNEY Oct. 2, 1945.  E. G. PIERCE  2,385,938
GAS FILTER
Filed Oct. 4, 1943  3 Sheets-Sheet 2

INVENTOR.
EDWIN G. PIERCE
BY O.Z.McCoy
ATTORNEY

Oct. 2, 1945.     E. G. PIERCE     2,385,938
GAS FILTER
Filed Oct. 4, 1943     3 Sheets-Sheet 3

INVENTOR.
EDWIN G. PIERCE
BY O.Z. McCoy
ATTORNEY

Patented Oct. 2, 1945

2,385,938

UNITED STATES PATENT OFFICE.

2,385,938

GAS FILTER

Edwin G. Pierce, Cleveland, Ohio

Application October 4, 1943, Serial No. 504,893

6 Claims. (Cl. 128—147)

This invention relates to gas absorbing devices for human use and more particularly to a gas filter of pocket size that is instantly available for emergency use and that provides adequate protection from gases for a sufficient time for its user to reach a place of safety.

In the past gas masks have been provided for the use of troups and civilians in the event of a gas attack under warfare conditions. Masks of this type are large bulky affairs that are cumbersome to carry, that enclose the face, that have a large hose connecting the facepiece with the canister, that are provided with an elaborate head harness, and that are primarily designed to protect the user under battle conditions.

The objects of the present invention include the provision of an efficiently functioning gas absorbing device of a size to fit within the pockets of ordinary clothes or of workmen's working clothes, or that may be stored in holders near his work, so that the device will always be conveniently with or near its owner or user who cannot be expected to always carry the large bulky gas masks that have been provided heretofore; the provision of a gas absorbing device that is instantly available for protection against toxic, objectionable or nauseous gases or war gases, for a sufficient period of time to enable the user to leave a gas filled environment and to locate a gas shelter or other place of safety; the provision of a device that remains securely sealed for protecting the gas absorbing contents of the canister portion thereof until the device is placed in use; that has a low breathing resistance within the allowed range for full sized gas masks of established and tested design; that leaves the vision unimpaired or that may be used with separate gas-tight goggles, if preferred; that is light in weight and comfortable to use; that is simple and fool proof in both design and operation; that is of rugged construction and not readily impaired in either its mechanical or in its chemical functions; that is well adapted for rapid and economical methods of manufacture and assembly so that it may be distributed at a nominal price and thru its widespread use save a maximum number of lives that would be lost otherwise; that may be taken apart, recharged chemically and resealed with a minimum of effort, time and expense and to adapt it to use for the presence of a particular toxic gas or industrial condition with a maximum absorption of that particular gas or for that particular industrial use; that can be readily made of non-strategic materials where that necessity is present; and that the possession of the device in an emergency will have the effect of retarding the feeling of panic in both individuals as well as in groups of people that might otherwise suffer loss of life arising from congestion where groups of panic stricken people trample upon each other at exits, and related situations.

With the above and other objects in view which will be apparent to those who are informed concerning devices for selectively absorbing toxic, objectionable or nauseous gases out of air to be inhaled, illustrative embodiments of the present invention are shown in the accompanying drawings, wherein:

Fig. 1 is a side elevation, partly broken away and in section, of a gas absorbing device that embodies the present invention;

Fig. 2 is an edge elevation, partly broken away and in section along the line 2—2 of Fig. 1, of the device that is shown in Fig. 1;

Fig. 3 is a plan view from above of the cover of the device that is shown in Fig. 1;

Fig. 4 is a side elevation of the cover of the device that is shown in Fig. 1, with the intake port uncovered, and the inhalation stem rotated and the nose clamp elevated into operative positions;

Fig. 5 is a perspective view of the device that is shown in Fig. 1 with the inhalation stem in the mouth and the nose clamp closing the nose on the face of a user;

Figure 6:
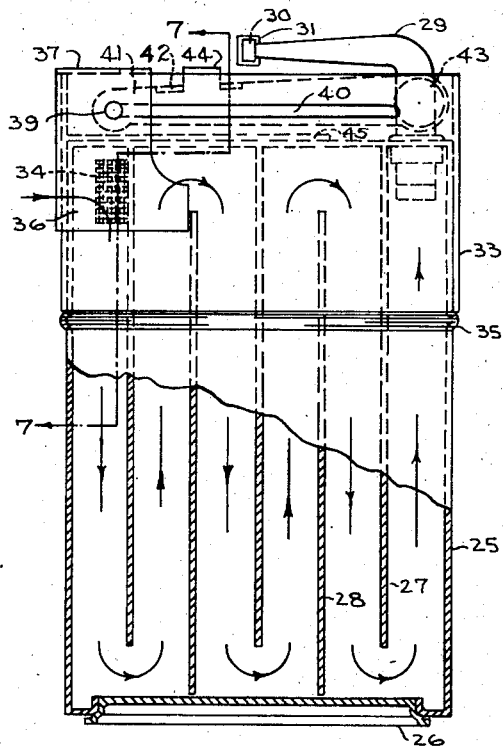
Fig. 6 is a side elevation, partly broken away and in section, of a modified form of gas absorbing device wherein the canister opens downwardly thereof.
Figures 7, 8:
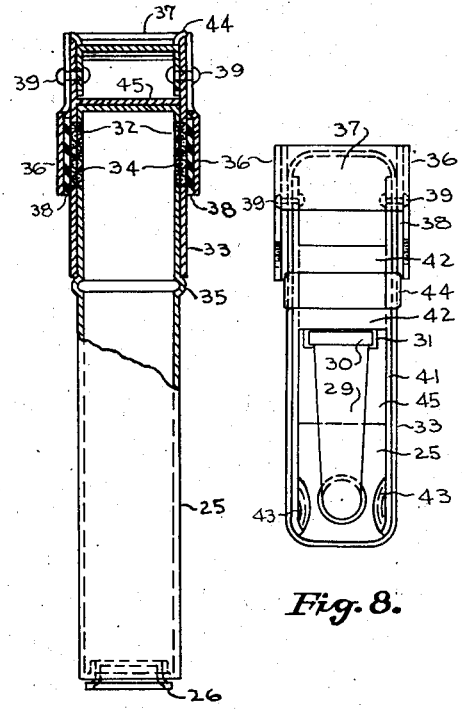
Fig. 7 is an edge elevation partly broken away and in section along the line 7—7 of Fig. 6, of the gas absorbing device that is shown in Fig. 6.
Fig. 8 is a plan view from above of the cover of the device that is shown in Fig. 6.

The first form of gas absorbing device that is shown in the accompanying drawings comprises a canister 1 that opens upwardly for the disposition of any desired mist, dust and gas absorb-material thereinto. The canister 1 is closed in any desired manner, as by a cover 2 that makes a sliding fit down over the open end of the canister 1. If preferred, the interior of the cover 2 may be coated with wax, a heavy grease, or the like, not shown, to maintain an air-tight seal between the canister 1 and the cover 2. The canister may, or may not, as preferred, be provided with a bead means, such as the rib 3 that is pressed outwardly in the sides and the ends of the canister 1, for partly overlying the lower edge of the cover 2 to improve the air-tight seal therebetween and to protect it from mechanical injury or from being inadvertently bent away from the outer surface of the canister 1.

The canister 1 is preferably partitioned internally by a plurality of upwardly extending partitions of substantially equal length so that a mixture of irrespirable gases and air in passing thru the canister will be directed along a channel of maximum practical length, and so that individual compartments are provided for the substantially separate disposition therein of a plurality of different mist, dust and gas absorbing materials within the canister. Preferably the partitions 4 are secured by welding or the like, to both sides and the bottom of the canister with their upper ends spaced downwardly from the upper edge of the canister so that when the cover 2 is in position thereon air may pass over the tops of the partitions 4.

The partitions 4 are preferably alternated with a plurality of partitions 5 that also are secured by welding or the like, to both sides of the canister 1, with their lower ends spaced upwardly from the bottom of the canister so that air may pass between the lower ends of the partitions 5 and the bottom of the canister 1. The upper ends of the partitions 5 are substantially flush with the upper edge of the canister so that the upper ends of the partitions 5 may be embedded, if desired, in wax, or the like, not shown, that may be disposed on the under side of the top of the cover 2 to thereby maintain an air-tight seal therebetween.

Both the canister 1 and the cover 2 are preferably punched on opposite sides of the canister 1 at the upper end of the first part of the channel therein, to provide pairs of intake orifice grids 6 and 7 respectively, that substantially register with each other in pairs. The intake orifice grids 6 and 7 may be removably closed in any desired manner when the device is not in use.

An inhalation stem 8, that preferably terminates at its free end in a suitable tooth engaging means such as the tip 9, or the like, is preferably rotatably mounted in the end of the cover 2, remote from the pair of intake grids 7, and so that the lower end of the inhalation stem 8 opens into the upper end of the last part of the channel in the canister 1. The inhalation stem 8 is preferably sealed in any suitable manner, as by a coating of air-tight water soluble material, such as gelatine 20, a sugar composition, or the like, that can be quickly dissolved when the inhalation stem 8 is positioned in the mouth of the wearer.

Suitable means, such as screens 10 and 11, pads of cotton, felt, or the like, are positioned inwardly of the canister intake orifices 6 and adjacent the lower end of the inhalation stem 8, respectively, for arresting the loss of fine granules of gas absorbing material with which the canister 1 is charged. The screens 10 and 11 are preferably removably disposed in the channel in the canister 1, so that they may be removed, the channel charged with gas absorbing material, and the screens replaced between the gas absorbing material and the intake and outlet ports of the canister 1.

The use of the device is illustrated in Fig. 5 of the accompanying drawings. When the operator inhales thru the inhalation stem 8, contaminated air is drawn thru the pairs of intake orifices 7 and 6 in that order, passes alternately in opposite directions along the channel within the canister where it permeates the gas absorbing material that is disposed therein, and purified air issues from the inhalation stem into the mouth of the user of the device. The device is made as light as possible so that it may be carried in the mouth somewhat as a pipe is carried, or its weight may be partly supported by permitting it to rest against the jaw or the chin, as shown in Fig. 5, thereby leaving both hands free, or it may be supported by hand if preferred.

The device may be used with or without, as preferred, a clamp for closing the nose of the wearer. The presence of the nose clamp as a part of the device minimizes the danger of error during the first stage of alarm when the user is suddenly confronted with the necessity of protecting himself from a poisonous gas, or the like. When a nose clamp is used, the wearer inhales thru the device and exhales by placing his tongue against the opening in the tip 9 at the end of the inhalation stem 8, and exhales thru his mouth around the inhalation stem. The device may be used with or without, as preferred, a pair of air-tight goggles, not shown, covering the eyes, or a preferred form of face mask or head enclosing bag or Pliofilm or other clear plastic, not shown, having an aperture adjacent the mouth for the insertion of the inhalation stem therethru into the mouth of the wearer.

When the device is not in use, the intake orifice grids 7 in the cover 2 are sealed and the inhalation stem 8 is closed against the entrance of air into the canister 1. The pair of intake orifice grids 7 in the cover 2 are closed in any suitable manner and preferably by the depending closure plates 12 that are disposed over the cover intake orifice grids 7 on the opposite sides of the cover 2. The closure plates 12 are joined together by the yoke 13 that extends across and rests upon the top of the cover 2. A suitable means, such as a rim of wax, hard grease, or the like, not shown, preferably surrounds the cover intake orifices 7 between the closure plates 12 and the cover 2, to perfect the air-tight seal therebetween and to prevent the impairment of the efficiency of the mist, dust, and gas absorbing charge that is disposed within the canister 1. The closure yoke 13 may, or may not, as preferred, have its edge nearer the inhalation stem 8 curved away from the inhalation stem as shown. The closure plates 12 may, if preferred, be permanently mounted upon the cover 2 and slidably mounted with respect thereto. For this purpose, a rivet 14, headed at both ends, extends through each of the plates 12, a longitudinally disposed slot formed in the cover, and one of the heads is disposed in a longitudinally extending groove 15 formed in the wall of canister 1. The grooves 15 in the canister and the slots in the cover extend substantially parallel with the top of the cover 2 and terminate short of the ends of the cover 2 so that the closure plates 12 cannot conveniently be separated from the cover 2 but can be moved a limited distance longitudinally thereof.

Where it is desired that a nose clamp is to be permanently attached to the device, a pair of nose clamps 16 are attached to the cover 2 and are stabilized laterally by suitable means such as the bridge 17 that connects together the pair of nose clamps 16. Nose clamps 16 at one end extend downwardly on opposite sides of the cover 2 and each is preferably pivotally journaled upon one of the rivets 14 which join them to the pair of depending closure plates 12. Opposite nose engaging ends 18 of the nose clamps 16 may, if preferred, carry on their facing surfaces suitable cushion pads 19 that are adapted to be disposed upon opposite sides of the nose of the wearer to close the nares thereof so that inhalation thru the nose is effectually prevented, as shown in Fig. 5 of the drawings.

The pivotal connection between the nose clamps 16 and the pair of closure plates 12 permit the nose clamps 16 to be elevated into operative position, the inhalation stem 8 rotated, and then the closure plates 12, guided by the grooves 15, are pushed longitudinally of the cover 2 from their position covering the intake ports 7 toward the inhalation stem 8 until the curved edge of the yoke 13 is adjacent to or against the base of the inhalation stem 8. The device is then ready for use as shown in Figs. 4 and 5 of the drawings, with the pair of intake orifices 7 uncovered for the admission of air therethru. The pivotal adjustability of the nose clamps 16 with respect to the inhalation stem 8, provides for adjusting the device to different people whose mouths and noses are separated different distances apart.

Where the pair of nose clamps are a part of the device, its weight is further supported by the grip of the nose clamps 16 upon the nose of the wearer so that both hands are free for the assistance of injured persons, the carrying of a flash light, or for such other use as may be desirable in an emergency.

When the device is stored and not in use the pivotal adjustability of the pair of nose clamps 16 permit them to be depressed along the top of the cover 2 along the opposite sides of the inhalation stem 8 to compact the device into a conveniently carried package of substantially rectangular shape. The stored device is preferably further sealed against access to the air when not in use by being enclosed within a sealed envelope of Cellophane, Pliofilm, or other suitable plastic, in somewhat the same manner in which packages of cigarettes are commonly sealed at the present time.

The gas absorbing device that is shown in Figs. 6-10, inclusive, of the accompanying drawings, comprises an upwardly closed canister 25 that is charged with any desired gas, mist, and dust absorbing granular material thru a suitable opening in its bottom surface that is closed in any suitable manner against the admission of air, as by a tightly fitting lid 26 or the like.

The interior of the canister 25 is preferably divided into a continuous channel from an intake port to a discharge port. Preferably a plurality of partitions 27 extend upwardly of the canister 25 and are sealed to the sides and to the top of the canister by being welded or the like thereto, and spaced upwardly from the bottom of the canister so that air may pass around the lower ends thereof. The partitions 27 are preferably alternated with a plurality of partitions 28 that are welded or otherwise secured to the sides of the canister so that they are spaced downwardly from the top of the canister in order that air may pass thereover, and so that their lower ends substantially contact the lid 26 of the canister 25 when the canister is closed.

The canister 25 is provided with a preferably rotatable air inhalation stem 29 that is provided at its free end with an apertured tooth engageable tip 30 that is removably sealed against the admission of air in any preferred manner, as by a seal 31 of air impervious material, such as gelatine, a sugar composition, or the like, that is soluble in water and that can be quickly dissolved in the mouth of the wearer. The inhalation stem 29 is mounted at and opens into the discharge end of the air channel within the canister 25. The canister 25 is preferably apertured on opposite sides thereof at the entrance of the canister channel and preferably thru a pair of grids 32 or the like, for the admission of air into the interior of the canister when it is in use. The pair of intake orifices 32 may be removably closed in any desired manner when the device is not in use.

The device is used by rotating the inhalation stem 29 and inserting its tip 30 into the mouth of the user where the gelatine seal 31 is quickly dissolved, thereby opening the orifice in the stem tip 30 to permit air to be drawn therethru. The closure means is removed from the pair of intake grids 32 so that when suction is applied to the orifice in the tip 30 of the inhalation stem 29 contaminated air passes thru the intake orifices 32, permeates the mist, dust and gas retaining granular charge within the canister 25 and purified air is drawn into the mouth of the user. If preferred, the canister 25 may be dimensioned so that contaminated air drawn into the canister remains there in substantially a dormant state for a period of time that passes between successive inhalation efforts by the user so that the contaminated air is in contact with the canister charge for a controlled period of time.

The canister 25 may, or may not as preferred, be provided with a mounting for a particular intake closure and a nose clamp thereon. For the convenience of those who prefer a nose clamp mounted upon the canister, a cover 33 is provided which makes sliding contact over the upper closed end of the canister 25. An intake orifice grid 34 in the cover 33 is positioned to be substantially in registration with the canister intake orifice 32 so that air entering the canister 25 passes thru the pair of cover intake orifices 34 and then thru the pair of canister intake orifices 32. The inner surface of the cover 33 may, if preferred, be coated with wax or the like, not shown, so that the cover 33 makes air-tight contact with the sides and the ends of the canister 25.

The canister 25 may be provided with or without as preferred, a bead or rib 35 that is pressed outwardly of the sides and the ends of the canister so that the lower edge of the cover 33 makes an improved seal with and is protected against inadvertent mechanical separation from the sides and the ends of the canister 25.

The pair of cover intake orifices 34 are closed in any suitable manner when the device is not in use, as by a pair of closure plates 36 that are suitably connected across the upper edges of the cover 33 by one or more yokes 37 or the like. A suitable air seal is provided between the pair of closure plates 36 and the sides of the cover 33 around the pair of intake orifices 34, as by air impervious pads 38 of rubber or the like, that are disposed therebetween and preferably secured to the closure plates 36 in any suitable manner.

The closure plates 36 are preferably movably mounted upon the cover 33, as by having rivets 39 disposed in apertures in the closure plates 36 and extending thru a pair of slots 40 that extend along the opposite sides of the cover 33, so that the closure plates 36 may be moved longitudinally of the cover 33 to expose the intake orifice grids 34 in the cover 33. The pair of rivets 39 have one of the ends of the pair of nose clamps 41 journaled thereon, preferably on the inner faces of the upwardly extending side walls of the open top of the cover 33 so that the nose clamps 41 may be depressed therebetween. The sides and the ends of the cover 33 are maintained in firm spaced relation with respect to each other in any suitable manner as by a plate 45 that is secured thereto along its periphery by welding or the like.

The pair of nose clamps 41 are provided with one or more stiffening bridges 42 for maintaining nose engaging pads 43, that face each other on the free ends of the pair of nose clamps 41, at a predetermined distance from each other. The metal of the pair of nose clamps 41 is preferably turned outwardly between the pair of bridges 42 shown to provide a pair of finger engageable ledges 44 that overlie the upper edges of the sides of the cover 33 sufficiently for being gripped by the fingers so that the free ends of the pair of nose clamps 41 may be conveniently elevated out of the open top of the cover 33 after the inhalation stem 29 is rotated into useable position.

Figure 9:
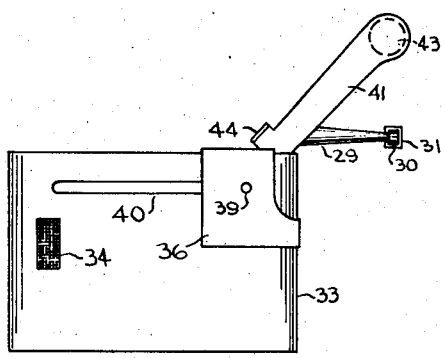
Fig. 9 is a side elevation of the cover of the device that is shown in Fig. 6 with the intake port uncovered, and the inhalation stem rotated and the nose clamp elevated into operative positions.

This type of the device is shown ready for application to the face of a wearer in Fig. 9 of the drawings, wherein the inhalation stem 29 is rotated preparatory to its being inserted into the mouth of the user; the pair of closure plates 36 are removed from their position overlying the intake orifice grids 34 so that their connecting yoke 37 is caused to approach or contact the base of the rotated inhalation stem 29; and the nose clamps 41 are elevated preparatory to having their pad portions 43 applied to the opposite sides of the wearer's nose.

Figure 10:
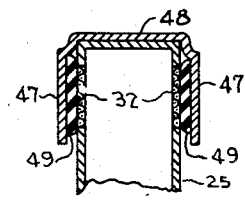
Fig. 10 is a fragmentary sectional view of the canister shown in Fig. 6 with a pair of closures slidably covering the pair of intake ports therein.

The canister 25 is shown in Fig. 10 with its pair of intake orifices 32 removably closed by a pair of closure plates 47 that are joined over the closed top of the canister 25 by a yoke 48 and with sealing pads 49 interposed between the closure plates 47 and the air intake orifice grids 32, as an adaptation of the device where the cover 33 and the pair of nose clamps 41 are omitted. With this adaptation a user may use a separate nose clamp, or he may exhale thru his nose if he prefers to do so.

Modified forms of mouth engageable inhalation stems are shown in Figs. 11–17, inclusive, of the accompanying drawings, for use as a part of the combinations disclosed herein.

Figure 11:
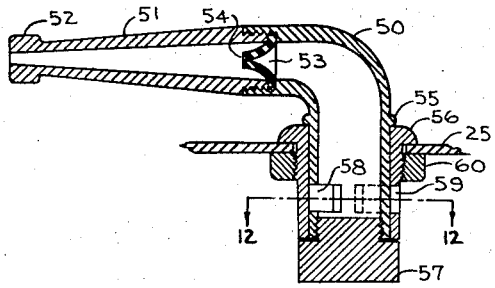
Fig. 11 is an enlarged sectional view taken longitudinally of an inhalation stem assembly for the device.
Figure 12:
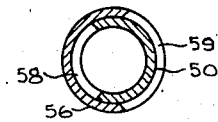
Fig. 12 is a section taken along the line 12—12 of Fig. 11.

The inhalation stem that is shown in Fig. 11 of the drawings comprises a curved portion 50 that makes a preferred form of union with an outer section 51, as by being threaded, slip fit, or otherwise fastened thereto by an air-tight junction. The outer section 51 terminates at its free end in a suitable apertured tooth engageable means such as a tip 52 or the like. A one-way valve 53 is preferably mounted in the bore of the inhalation stem, as by having its base clamped, as an air-sealing washer would be clamped, between the inhalation stem curved portion 50 and the outer section 51 at the junction thereof.

The air valve 53 comprises a normally closed pair of contacting lip portions 54 that yieldingly separate when air from the canisters 1 or 25 is drawn thru the aperture in the tip 52 of the inhalation stem. The lip portions 54 of the air valve 53 contact each other in substantially air sealing engagement when the device is not in use, or should the user of the device exhale air into the outer section 51 of the inhalation stem.

The inhalation stem curved portion 50 is mounted in the canister cover 2 or in the canister 25, in any desired manner, as by being rotatably journaled in a fitting 56 and provided with a bearing ring 55 that makes frictional engagement with the upper edge of the fitting 56 to arrest the downward motion of the portion 50 of the inhalation stem. The inhalation stem curved portion 50 is closed at its lower end and rotatably secured with respect to the fitting 56 in any suitable manner, as by the plug 57 that enters and makes threaded engagement with the inhalation stem curved portion 50 and that has a radially extending portion that overlies the lower end of the fitting 56. The fitting 56 is disposed in the discharge aperture in the canister cover 2 or in the canister 25, in air-tight engagement therewith, as by being secured thereto by suitable means such as the nut 60.

An air conducting port 58 in the inhalation stem curved portion 50 is rotatably opposed to an air conducting port 59 in the fitting 56 so that when the inhalation stem is in its closed position, in which position it extends away from the edge of the cover 2 or the canister 25, as shown in Fig. 11, the ports 58 and 59 are sealed with respect to each other. When the inhalation stem is rotated into operative position the port 58 opens thru the port 59 and permits the passage of purified air out of the canister into the inhalation stem.

Figure 13:
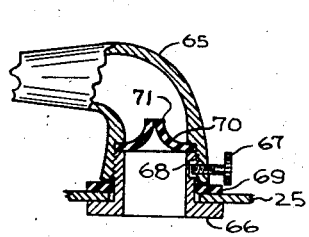
Fig. 13 is an enlarged fragmentary view, partly in section, of a modified form of inhalation stem assembly.

Another form of inhalation stem is shown in Fig. 13 of the drawings wherein an inhalation stem 65 is internally threaded at its larger end to engage an externally threaded apertured fitting 66 with which it is maintained in non-rotating engagement by a suitable means, such as a thumb screw 67 that threads thru the wall of the base of the inhalation stem 65 and has its smaller end seated in any one of a plurality of depressions 68 that are spaced circumferentially of the outer wall of the fitting 66. Suitable means, such as a washer 69 maintains air-sealing engagement between the inhalation stem 65 and the canister 25, or the cover 2 of the canister 1, in the discharge aperture of which the inhalation stem 65 is rotatably mounted.

Suitable means for permitting air to flow thru the inhalation stem 65 outwardly only of the canisters 1 or 25 is provided, as by a resilient air valve 70 that has its base disposed between a downwardly facing shoulder in the bore of the inhalation stem 65 and the upper edge of the bore of the fitting 66. The air valve 70 has yieldingly contacting lip portions 71 that permit air to flow from the canisters 1 or 25 and substantially arrest the flow of air in the reverse direction.

Figure 14:
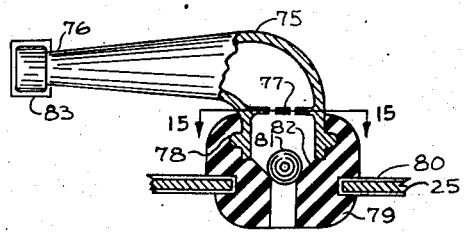
Fig. 14 is an enlarged fragmentary view, partly in section, of another modified form of inhalation stem assembly.
Figure 15:
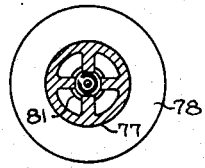
Fig. 15 is a section taken along the line 15—15 of Fig. 14.

A further modified form of inhalation stem assembly is shown in Figs. 14 and 15 of the drawings, wherein an inhalation stem 75 has a tip 76 at its free end, a plurality of inwardly extending stops 77 in its bore, and is provided adjacent its larger end with an outwardly disposed rib 78 that seats within an annular groove in the radially inside wall of the rubber grommet 79 that is forced within the outlet orifice in the cover 2 of the canister 1, or in the canister 25. Wax 80 may, if desired, be interposed between the grommet 79 and the cover 2 of the canister 1, or the canister 25, to insure an air-tight seal therebetween.

The bore of the grommet 79 opens into the bore of the inhalation stem 75 for conducting air that has been purified by having passed thru the canister 1 or 25, and is preferably releasably sealed against the passage of air in the opposite direction in any desired manner, as by means of a ball valve 81 that removably seats against a suitable valve seat 82 portion of the grommet 79. The valve seat 82 portion of the grommet 79 is provided by the cross-sectionally reduced longitudinally thru passage of the grommet bore to provide a seat integral with the grommet and faced toward the inhalation stem 75.

The ball valve 81 is prevented from lodging fast within the inclined bore of the inhalation stem 75 in any suitable manner, as by the stops 77 or the like, that extend inwardly of the bore of the inhalation stem 75 sufficiently to arrest the passage of the ball valve 81 when the device is inverted, shaken, or otherwise disturbed.

The inhalation stems 75 and 65 may be further sealed against the inadvertent passage of air thru the bores thereof by a suitable seal enclosing the tips thereof, as by a coating of a water-soluble sealing material such as gelatine 83, a sugar composition, or the like, that is applied thereto and that is quickly soluble in water when the tip of the inhalation stem is placed in the mouth of a wearer of the device.

Figure 16:
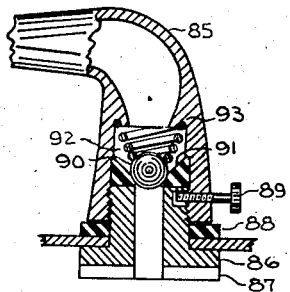
Fig. 16 is an enlarged fragmentary view, partly in section, of a further modification in the inhalation stem assembly.
Figure 17:
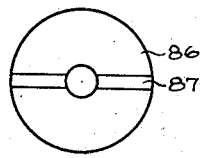
Fig. 17 is a plan view from below of the slotted plug that is shown in Fig. 16.

A further modification of the inhalation stem assembly is shown in Figs. 16 and 17 of the drawings, wherein an inhalation stem 85 is threaded internally at its lower and larger end for the reception of an apertured screw 86 that threads thereinto by the application of a screw driver blade to the tool slot 87. The inhalation stem 85 makes an air-tight junction with the cover 2 of the canister 1, or with the canister 25, by suitable means such as by a washer 88 being interposed therebetween. The rotation of the inhalation stem 85 and screw 86 with respect to the canister cover 2, or the canister 25, is preferably insured by suitable means, such as by a thumb screw 89, or the like, that threads thru the base of the inhalation stem 85 and has its tip seat into one of a plurality of depressions in the radially outer face of the screw 86, or the like.

The bore of the screw 86 opens into the bore of the inhalation stem 85 and conducts canister purified air into inhalation stem 85. Suitable valve means is provided for arresting the back flow of air thru the inhalation stem in any suitable manner, as by the provision of a ball valve 90 that makes releasable air-sealing engagement with a suitable valve seat 91 of rubber, leather, or the like, that is mounted in the bores of the inhalation stem 85 and the screw 86, preferably at the junction thereof, where it is suported axially by resting upon the radially extending upper rim of the screw 86, or the like. Suitable means, such as the very light coil spring 92 seats at its lower end upon the ball valve 90 and at its upper end in a downwardly opening groove 93 in the bore of the inhalation stem 85.

The filtering devices that are illustrated and described herein are adapted for being made of a plastic, a metal, or a hard pressed paper composition that permit a considerable range in the quantity, weight and appearance of the product, as well as in its costs of manufacture. Various changes may be made in the parts of the device to adapt it to particular uses and types of service for which it may peculiarly adapt itself.

It is to be understood that the various forms of parts of the filtering device that are disclosed herein are submitted for the purposes of illustrating and describing the present invention and that various modifications may be made therein without departing from the present invention as defined by the appended claims.

What I claim is:

1. Apparatus of the class described comprising a rectangularly-shaped canister for receiving air purifying material, said canister having an inlet port adjacent one end thereof and an outlet port at its top adjacent the other end thereof, baffle means arranged within said canister for directing air from said inlet port to said outlet port so that air entering the intake port traverses said material in its passage to the outlet port, inhalation means positioned at said outlet port including a hub having a rigid bored stem arranged at an angle thereto which terminates in a mouth piece and which stem including said mouth piece is of less length than said canister, said hub being rotatably associated with said canister to position said stem including said mouth piece over the canister between its sides when the canister is not in use and the angle of said stem and mouth piece with respect to said hub being such that said stem and mouth piece are in close proximity to the canister when the canister is not in use to provide a compact assembly, and said hub being also rotatable to position said stem and mouth piece to extend away from said canister when the canister is to be used.

2. Apparatus of the class described comprising a canister provided with a chamber for receiving an air purifying material, said canister being provided with an inlet port and an outlet opening arranged so that air entering the inlet port traverses said material in its passage to the outlet opening, a bushing arranged in said outlet opening provided with a side port, inhalation means including a hub having a bored stem arranged at an angle thereto, said hub being rotatably mounted in said bushing and having its inner end closed and a side port, and the ports in said hub and bushing being so arranged that when the stem is over the canister, the ports are closed and when the hub is rotated to position the stem away from the canister, the ports are in registry to provide an outlet passage to said stem.

3. Apparatus of the class described comprising a rectangularly-shaped canister having a plurality of baffles attached to the sides and extending downwardly from the top, a plurality of alternately disposed baffles attached to the sides and extending upwardly from the bottom to form a plurality of intercommunicating chambers between the baffles and between each of the ends and the respective baffle in closest proximity thereto, air purifying material arranged in said chambers, an inlet port leading into the upper portion of the chamber formed by one end wall and the baffle in closest proximity thereto and an outlet port arranged through the top of said canister adjacent one end and communicating with the chamber formed by the other end wall and the baffle in closest proximity thereto, and inhalation means positioned at said outlet port including a hub having a bored elongated rigid stem arranged at an angle thereto which terminates in a mouth piece which stem and mouth piece are of less length than said canister, and said hub being rotatably associated with said canister to position said stem lengthwise over said canister between the two sides when the canister is not in use and to position said stem to extend away from said canister when the canister is in use.

4. Apparatus of the class described comprising a canister provided with a chamber for receiving air purifying material, said canister being provided with an inlet port and an outlet opening spaced from each other so that air entering the inlet opening traverses said material in its passage to the outlet opening and said outlet opening being arranged in the top of said canister adjacent one edge thereof, a bushing arranged in said outlet opening provided with a port, inhalation means including a hub having a bored stem arranged at an angle thereto, said hub being rotatably associated with said bushing and having a port, and the ports in said bushing and hub being so arranged that when the hub is rotated to position the stem over the canister the ports are closed and when the hub is rotated to position the stem away from the canister the ports are in registry to permit purified air to pass from the canister through said ports into said stem.

5. Apparatus of the class described comprising a substantially rectangularly shaped canister having apertures on opposite sides near its upper portion adjacent one end thereof, an outlet port at the top of said canister adjacent the other end, inhalation means positioned at said outlet port including a hub having an elongated bored stem inclined at an angle thereto which stem terminates in a mouth piece and said hub being rotatably mounted in said canister to position said stem lengthwise over said canister when the canister is not in use and to extend it outwardly away from the canister when the canister is in use, a slidable closure for sealing the inlet ports and a nose clamp pivotally mounted on said closure and being adapted to slide said closure to open the inlet ports when it is positioned on the nose of a wearer whose mouth engages the outwardly extended mouth piece.

6. Apparatus of the class described comprising a substantially rectangular-shaped canister having inlet ports at opposite sides at its upper portion adjacent one end thereof and an outlet port at its top adjacent the other end thereof, a cover for said canister having an open top and ports in registry with the inlet ports in said canister and said cover being provided with longitudinally extending slots, a slidable closure for closing said inlet ports when the canister is not in use, a nose piece pivotally connected to said closure by means extending through said slots and being adapted to rest on said canister between the side walls of said cover when not in use, inhalation means positioned at said outlet port, said inhalation means including a hub having an elongated stem arranged at an angle thereto, said hub being rotatably associated with said canister to position said stem over the canister when the canister is not in use and to position said stem outwardly away from the canister when it is to be used, and said nose piece being movable toward said hub when said stem extends away from said canister to move said closure from the inlet ports and to position said nose piece to the nose of a wearer whose mouth engages said outwardly extending stem.

EDWIN G. PIERCE.